(12) United States Patent
Ramos, Jr.

(10) Patent No.: US 11,415,400 B2
(45) Date of Patent: Aug. 16, 2022

(54) COMBINATION TOOL FOR MARKING, MEASURING, AND CHECKING LEVEL

(71) Applicant: Jose C. Ramos, Jr., Aurora, CO (US)

(72) Inventor: Jose C. Ramos, Jr., Aurora, CO (US)

( * ) Notice: Subject to any disclaimer, the term of this patent is extended or adjusted under 35 U.S.C. 154(b) by 182 days.

(21) Appl. No.: 16/739,274

(22) Filed: Jan. 10, 2020

(65) Prior Publication Data

US 2020/0225016 A1 Jul. 16, 2020

Related U.S. Application Data

(60) Provisional application No. 62/792,069, filed on Jan. 14, 2019.

(51) Int. Cl.
| | | |
|---|---|---|
| *G01B 3/04* | (2006.01) | |
| *G01B 3/1092* | (2020.01) | |
| *G01B 3/1089* | (2020.01) | |
| *B25H 7/04* | (2006.01) | |
| *B43K 29/00* | (2006.01) | |

(52) U.S. Cl.
CPC ............... *G01B 3/04* (2013.01); *B25H 7/04* (2013.01); *B43K 29/004* (2013.01); *G01B 3/1089* (2020.01); *G01B 3/1092* (2020.01)

(58) Field of Classification Search
CPC ...... G01B 3/04; G01B 3/1092; G01B 3/1089; B25H 7/04; B43K 29/004; B43K 19/00
USPC .................................................... 33/451, 484
See application file for complete search history.

(56) References Cited

U.S. PATENT DOCUMENTS

| | | | | |
|---|---|---|---|---|
| 2,251,640 A | * | 8/1941 | Skrainka ............... | B43K 29/08 33/372 |
| 3,392,449 A | * | 7/1968 | Tierney ................... | B25H 7/04 33/27.03 |
| 4,197,649 A | * | 4/1980 | Flinn ......................... | B43L 7/00 33/32.1 |
| 4,700,489 A | * | 10/1987 | Vasile .................... | G01B 3/566 33/342 |
| 5,522,146 A | | 6/1996 | Warburton | |
| 6,421,928 B1 | * | 7/2002 | Miller .................... | A47G 1/205 33/520 |
| 6,473,983 B1 | * | 11/2002 | Gier ....................... | A47G 1/205 33/613 |
| 6,599,045 B1 | | 7/2003 | Kolb | |

(Continued)

OTHER PUBLICATIONS

US 8,801,309 B2, 08/2014, Ryan (withdrawn)

*Primary Examiner* — Yaritza Guadalupe-McCall
(74) *Attorney, Agent, or Firm* — Trenner Law Firm, LLC; Mark D. Trenner (57) ABSTRACT

An example combination tool for marking, measuring, and checking level includes a holder for a marking device (e.g., a soapstone). The holder has a body formed by a first side, a second side, a front side, a back side a top side, and a flat bottom side. A securement releasably secures the marking device at least partially within the body. Turning the securement in a first direction tightens the marking device within the body of the holder. Turning the securement in a second direction loosens the marking device in the body of the holder so that the marking device slides in and out through an opening formed in the front side of the body to adjust a position of the marking device for use in marking. The example combination tool may also include measuring markings, a level, a clip, and a grip.

18 Claims, 10 Drawing Sheets

(56) References Cited

U.S. PATENT DOCUMENTS

| | | | | |
|---|---|---|---|---|
| 6,708,417 B1* | 3/2004 | Wilkins | ............. | B25H 7/02 33/27.03 |
| 6,739,065 B2* | 5/2004 | Hofmeister | ............. | A47G 1/205 33/451 |
| 7,080,459 B1* | 7/2006 | Khan | ............. | B43L 7/005 33/27.03 |
| 7,645,083 B2* | 1/2010 | Burry | ............. | B43K 23/008 401/93 |
| 7,743,522 B2* | 6/2010 | Ruzio | ............. | B25H 7/02 33/492 |
| 8,061,054 B2* | 11/2011 | Rabin | ............. | G01C 9/28 33/613 |
| D660,910 S * | 5/2012 | Carpenter | ............. | D19/133 |
| 8,590,170 B2* | 11/2013 | Wagner | ............. | B25F 1/04 33/760 |
| D698,863 S * | 2/2014 | Ryan | ............. | D19/123 |
| 8,739,423 B1* | 6/2014 | Cortum | ............. | G01C 9/28 33/613 |
| 8,763,270 B1* | 7/2014 | Spear, IV | ............. | G01B 3/28 33/518 |
| 8,819,948 B2* | 9/2014 | Chamberlain | ............. | B25H 7/04 33/41.5 |
| 8,869,410 B1* | 10/2014 | Callahan | ............. | A61C 7/146 33/514 |
| 9,009,983 B1* | 4/2015 | Morris | ............. | B25H 7/04 33/21.1 |
| 9,709,393 B2* | 7/2017 | Oppenheim | ............. | G01C 15/02 |
| D805,585 S * | 12/2017 | Ryan | ............. | D19/185 |
| 10,690,471 B1* | 6/2020 | DuFaux | ............. | G01B 3/002 |
| 2003/0033722 A1* | 2/2003 | Lanham | ............. | G01C 9/26 33/374 |
| 2003/0051363 A1* | 3/2003 | Hofmeister | ............. | A47G 1/205 33/613 |
| 2004/0172846 A1* | 9/2004 | McRae | ............. | G01B 3/1041 33/760 |
| 2007/0234483 A1* | 10/2007 | Kunz | ............. | G01C 9/28 7/143 |
| 2012/0134736 A1* | 5/2012 | Ryan | ............. | B43K 29/004 401/52 |
| 2016/0288315 A1* | 10/2016 | Choate | ............. | B25H 7/045 |
| 2016/0325421 A1* | 11/2016 | Bruno | ............. | B25C 3/008 |
| 2020/0225016 A1* | 7/2020 | Ramos, Jr. | ............. | B25H 7/04 |

* cited by examiner

COMBINATION TOOL FOR MARKING, MEASURING, AND CHECKING LEVEL

PRIORITY CLAIM

This application claims the priority benefit of U.S. Provisional Patent Application No. 62/792,069 filed Jan. 14, 2019 titled "Combination Tool For Marking, Measuring, And Checking Level" of Jose Ramos JR, hereby incorporated by reference in its entirety for all that it discloses as though fully set forth herein.

BACKGROUND

There are several tools that are necessary when completing various construction and welding projects. Most builders need a leveling device, a measuring device and a marking device. Transporting these separate devices is inconvenient and takes up valuable space in a tool belt. Many times it necessary to complete these tasks quickly and on demand and it can be difficult to locate the necessary separate tools when needed. This may lead some individuals to estimate, which can result in errors being made and thus potential delays and higher costs due to the errors.

DETAILED DESCRIPTION

When performing tasks, a carpenter or other individual may need to carry around multiple tools. An example of a combination tool for marking, measuring, and checking level is disclosed herein as it may be configured as an "all in one" tool that is designed to assist users in measuring, leveling, and marking. In an example, the combination tool provides a holder for a marking device (e.g., soapstone or flat pencil), measurement markings, and one or more level (e.g., for checking vertical and horizontal level).

An example combination tool for marking, measuring, and checking level includes a holder for a marking device. The holder has a body formed by a first side, a second side, a front side, a back side, a top side, and a flat bottom side. A securement releasably secures the marking device at least partially within the body. Turning the securement in a first direction tightens the marking device within the body of the holder. Turning the securement in a second direction loosens the marking device in the body of the holder so that the marking device slides in and out through an opening formed in the front side of the body to adjust a position of the marking device for use in marking;

The example combination tool also includes measuring markings on at least one of the sides of the body. The example combination tool also includes at least one level in the body so that the user can check level (e.g., vertical and/or horizontal) without having to get a separate level checking device. The example combination tool also includes a clip to secure the holder to a clothing item so that the tool is always at the ready on the jobsite. The example combination tool also includes a grip on at least one of the sides of the holder so that the user can grasp the holder without it sliding during use (e.g., when the user's hands are wet or dirty).

Before continuing, it is noted that as used herein, the terms "includes" and "including" mean, but is not limited to, "includes" or "including" and "includes at least" or "including at least" The term "based on" means "based on" and "based at least in part on."

In an example, the components and connections depicted in the figures may be implemented to carry out the operations. The operations shown and described herein are provided to illustrate example implementations. It is noted that the operations are not limited to the ordering shown. Still other operations may also be implemented.

Figure 1:
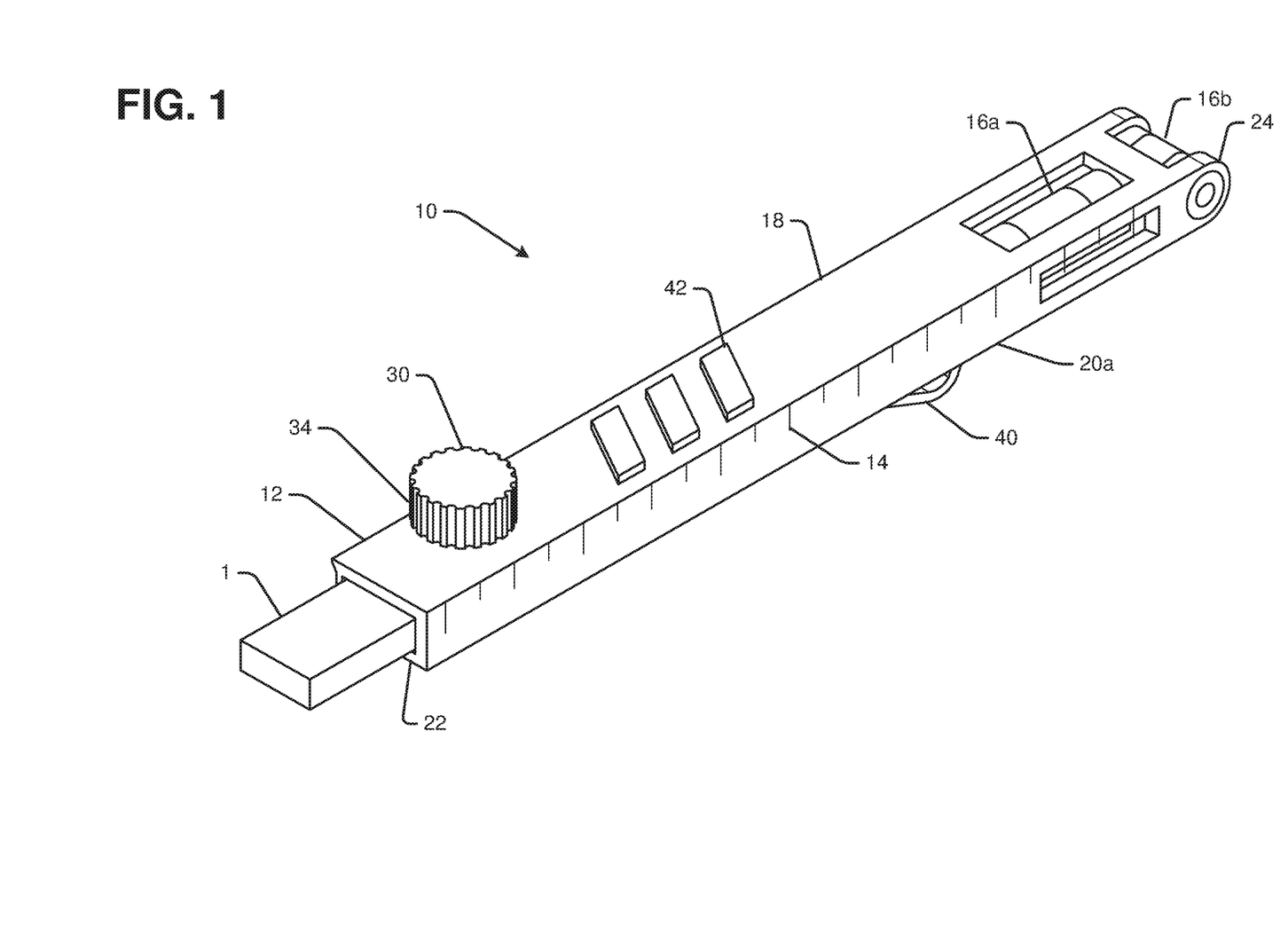
FIG. 1 is a perspective view of an example combination tool for marking, measuring, and checking level, as it may be configured for a square soapstone.
Figure 2:
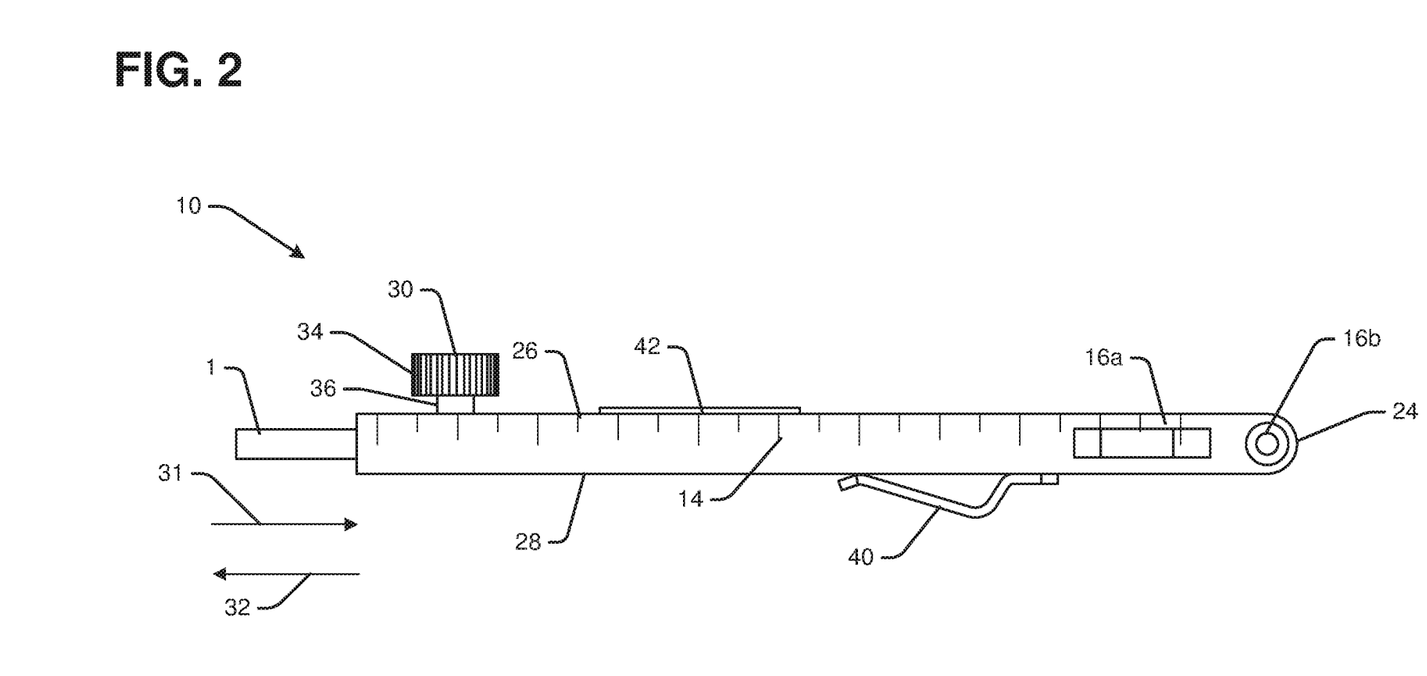
FIG. 2 shows a left side view and a back side view of the example combination tool of FIG. 1.
Figure 3:
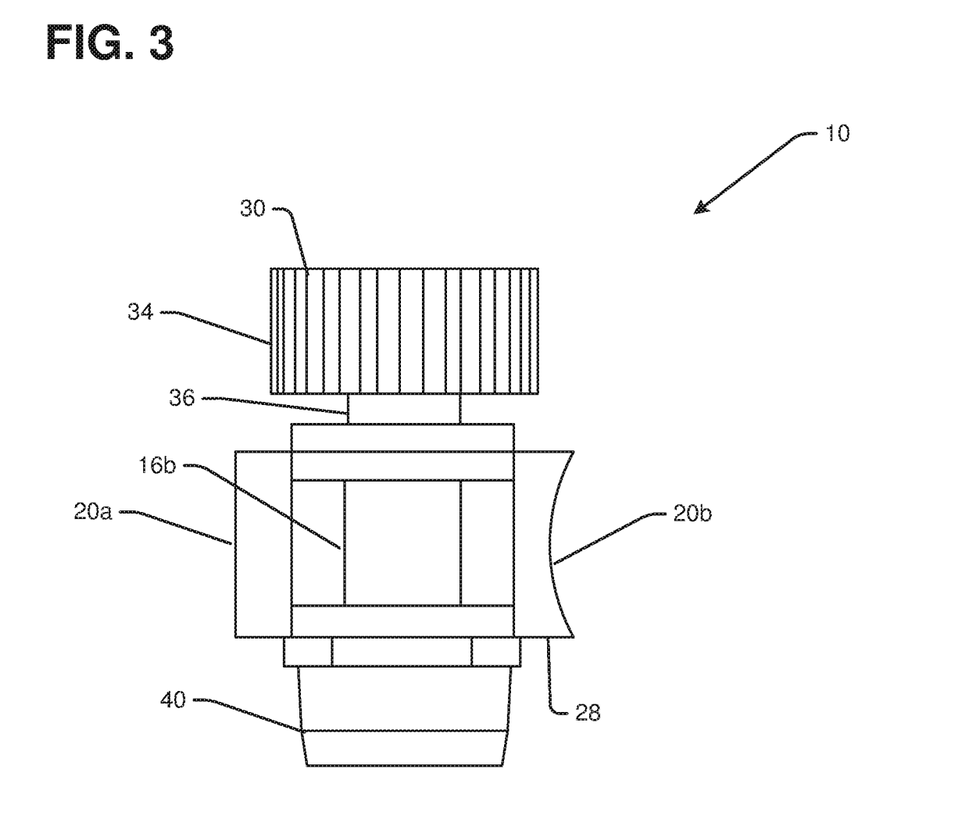
FIG. 3 shows a back side view of the example combination tool of FIG. 1.
Figure 4:
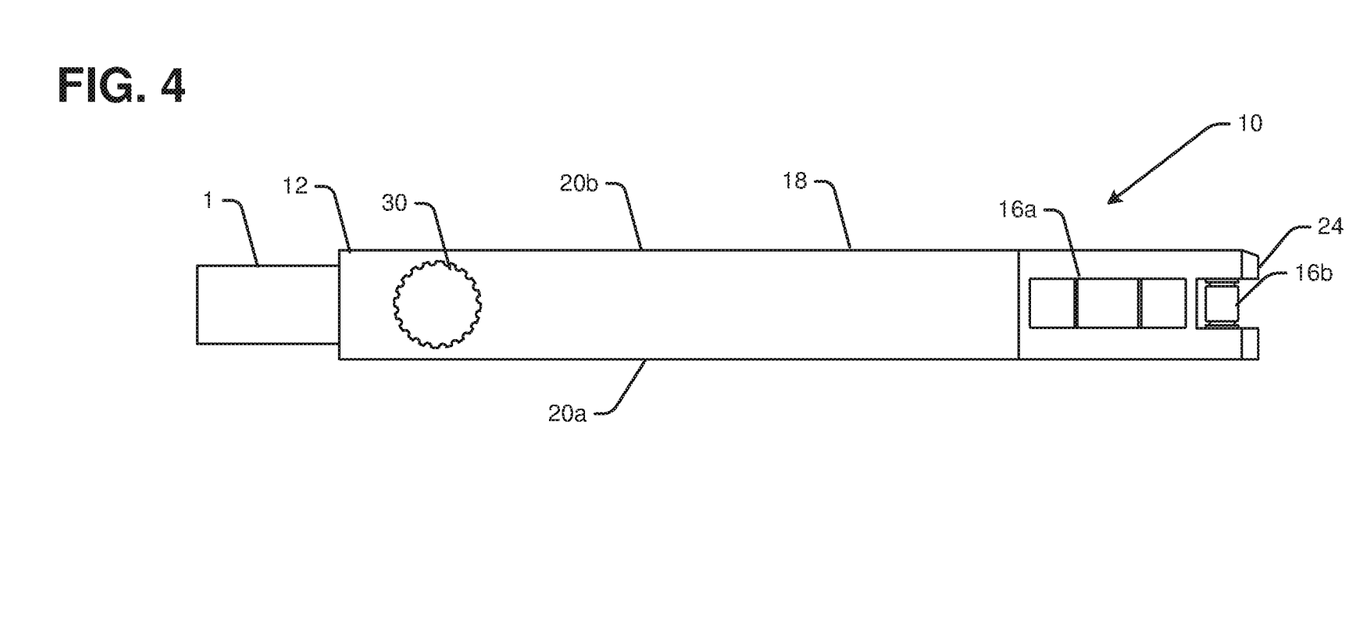
FIG. 4 shows a top view of the example combination tool of FIG. 1.
Figure 5:
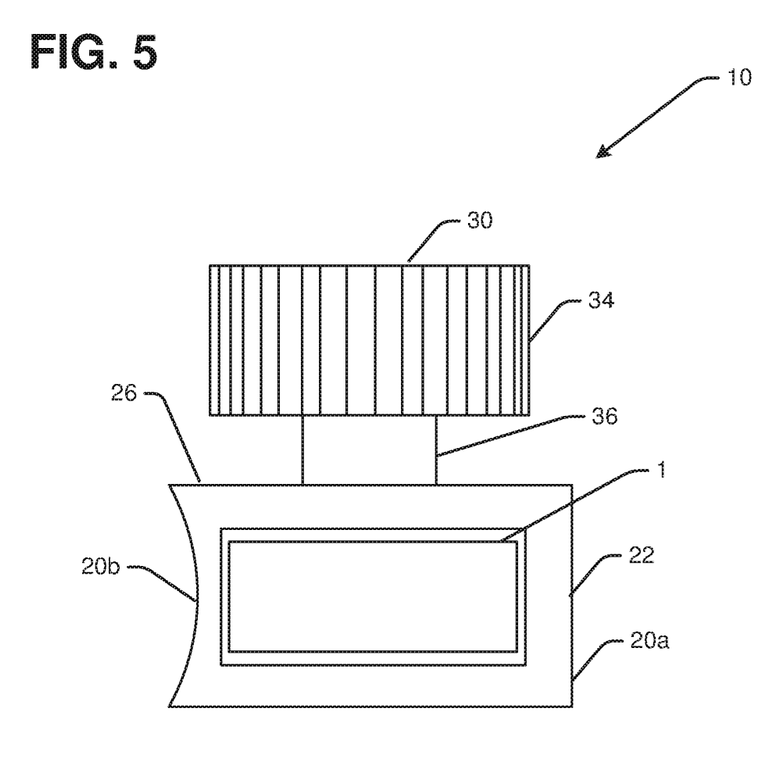
FIG. 5 shows a front side view of the example combination tool of FIG. 1.

FIG. 1 is a perspective view of an example combination tool 10 for marking, measuring, and checking level, as it may be configured for a square soapstone 1. FIG. 2 shows a left side view and a back side view of the example combination tool 10. FIG. 3 shows a back side view of the example combination tool 10. FIG. 4 shows a top view of the example combination tool 10. FIG. 5 shows a front side view of the example combination tool 10.

In an example, the combination tool 10 combines a marking device 1 (e.g., soapstone or flat pencil), a holder 12 for the marking device 1, measurement markings 14, and one or more level 16*a*, 16*b* (e.g., vertical and horizontal) into a single tool that can be readily carried by a carpenter or other individual. In this example, the holder 12 is configured to retain a substantially square or rectangular marking device 1 (e.g., soapstone, pencil, marker, or other marking device).

Although described herein primarily as the combination tool 10 may be configured for a soapstone, any suitable marking device 1 may be provided, as will be readily understood by those having ordinary skill in the art after becoming familiar with the teachings herein.

In an example, the holder 12 has a body 18 formed by a first side 20*a*, a second side 20*b*, a front side 22, a back side 24, a top side 26, and a bottom side 28. At least the bottom side 28 is flat so that the body 18 can be set against or laid to rest on a flat surface (e.g., for measurement and/or checking level).

A securement 30 may be provided to releasably secure the marking device 1 at least partially within the body 18. During use, loosening the securement 30 enables the marking device 1 to be slid in and out (illustrated in FIG. 2 by arrows 31 and 32) through an opening formed in the front side 22 of the body 18 to adjust the marking device 1 for use in marking. For example, the marking device 1 can moved outward from the opening in the body 18 (e.g., in the direction of arrow 32) for use in marking.

By way of illustration, as the marking device 1 wears down (e.g., during marking), is broken, and/or otherwise needs to be adjusted for marking, then the securement 30 may be loosened so that the marking device 1 can be slid out from the body further. The securement 30 can then be tightened to hold the marking device 1 in a fixed position for marking. The securement 30 can likewise be loosened for replacement of the marking device 1 with a fresh marking device.

In an example, the securement 30 includes a head 34 and a shaft 36. The head 34 may be operated to rotate the shaft 36. The shaft 36 may be threaded through the body 18 and into an inner cavity formed within the body 18 where the marking device 1 is inserted. Turning the head 34 in a first direction (e.g., clockwise) moves the shaft 36 down against the marking device 1 to hold the marking device 1 in a fixed position (e.g., for use). Turning the head 34 in a second direction (e.g., counter-clockwise) moves the shaft 36 up and releases the marking device 1 for adjusting a position of the marking device 1 (e.g., to extend at a predetermined distance out of the body) and/or to remove/replace the marking device 1 in the holder 12.

It is noted that other configurations of securement 30 are also contemplated as will be readily apparent to those having ordinary skill in the art after becoming familiar with the teachings herein.

In an example, the body 18 may include measuring markings 14 on at least one of the sides (e.g., sides 20*a*, 20*b*, top 26 and/or bottom side 28). In an example, one of the sides (e.g., 20*a*) has measurement markings 14 in inches, and the other side (e.g., 20*b*) has measurement markings 14 in centimeters.

In an example, the combination tool 10 may also include a clip 40 so that it can be secured to a clothing item, such as but not limited to a belt, shirt, pants, or pocket worn by the user. The clip 40 may also be implemented to secure the combination tool 10 to a tool bag, clipboard, or other suitable location so that the combination tool 10 is readily available when needed by the end user.

In an example, the combination tool 10 may also include a grip 42 on at least one of the sides of the holder. In the illustration of FIG. 1, the grip 42 is shown having a plurality of finger ribs. The grip 42 may be a padding made of rubber, silicon or other non-slip material. In another example, the grip 42 may be formed as part of the holder 12 (e.g., a molded finger print in the body 18).

It is also noted that the examples described herein are provided for purposes of illustration, and are not intended to be limiting. Other devices and/or device configurations may be utilized to carry out the operations described herein.

Figure 6:
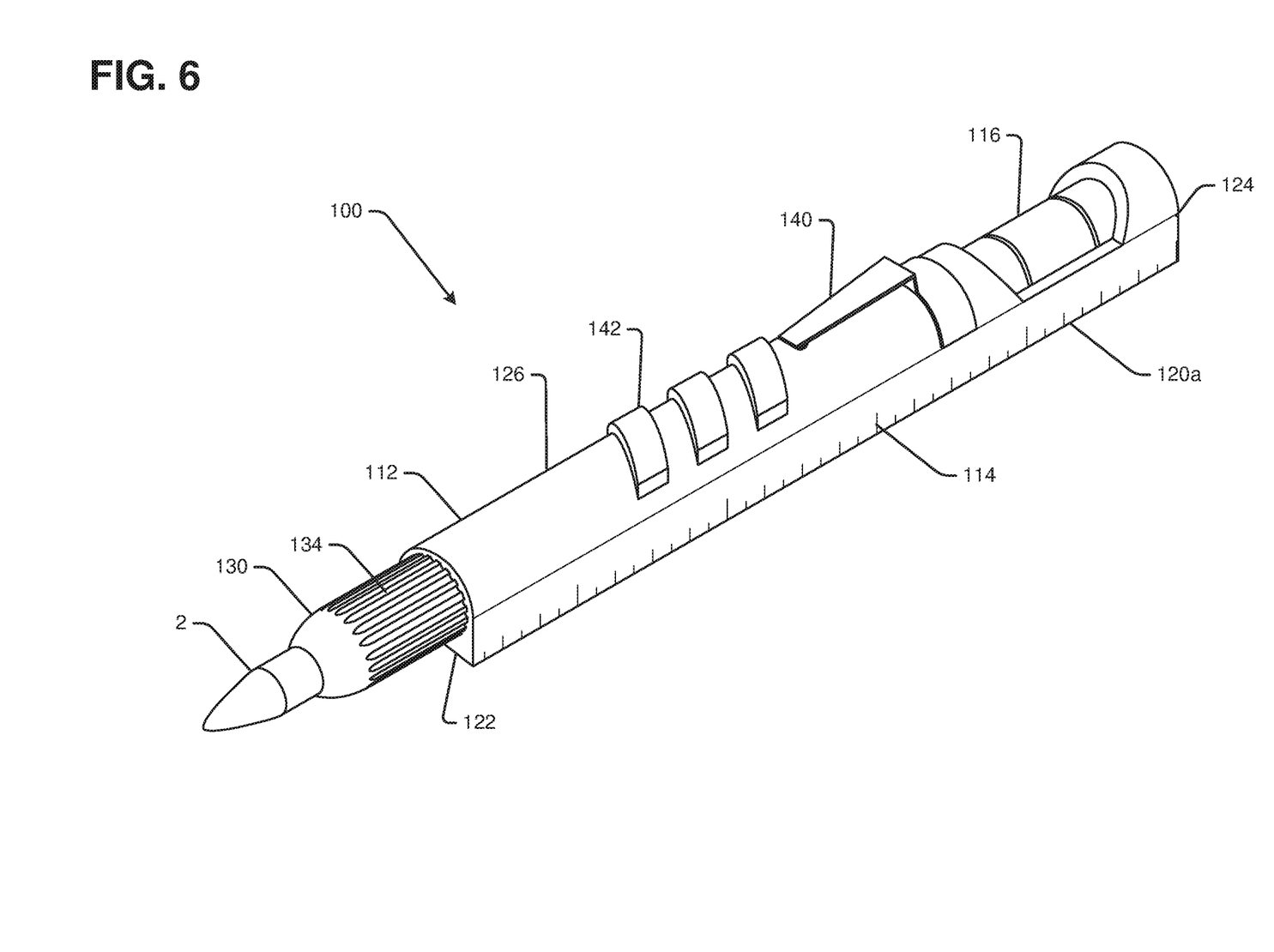
FIG. 6 is a perspective view of an example combination tool for marking, measuring, and checking level, as it may be configured for a round soapstone.
Figure 7:
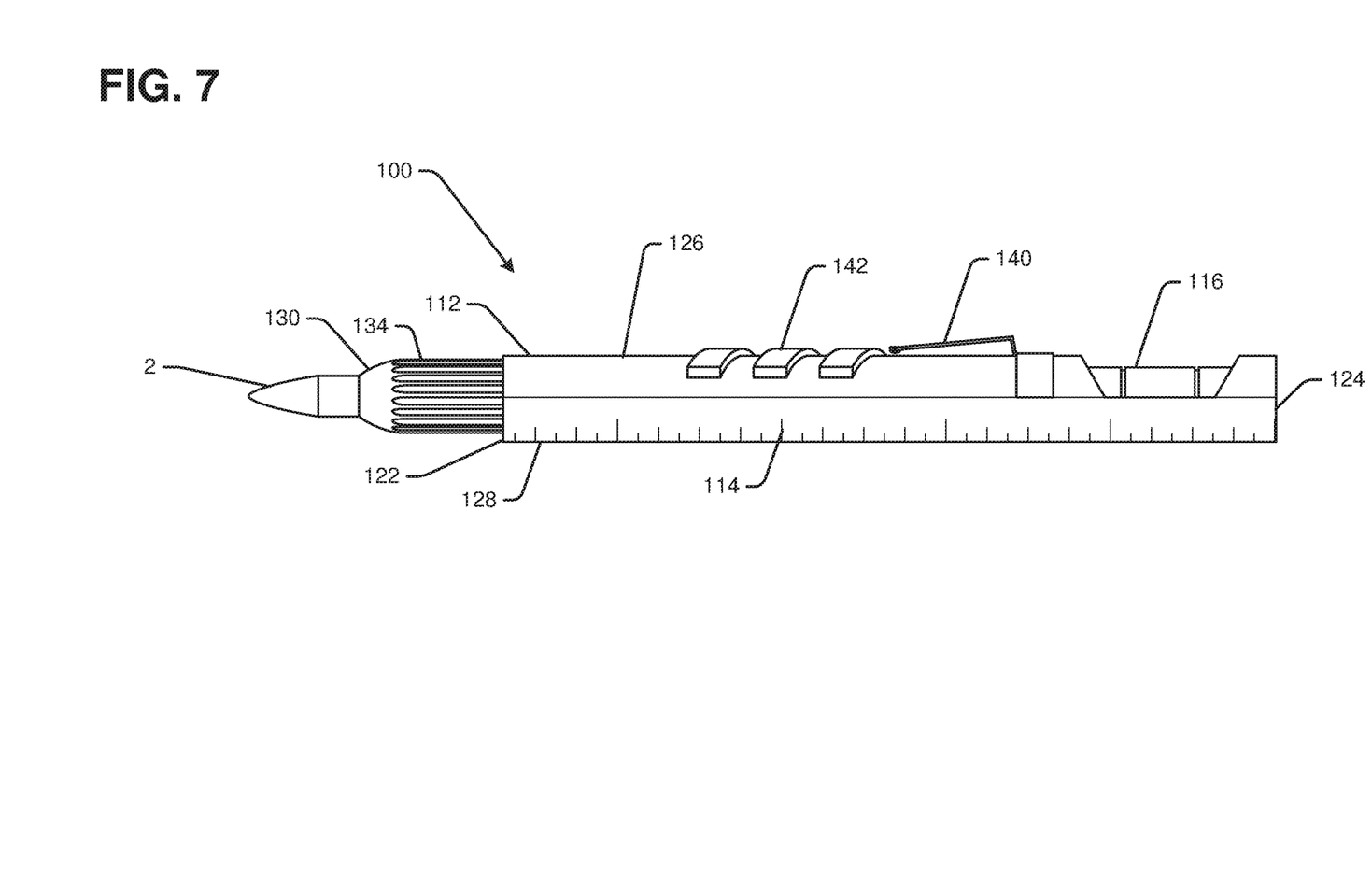
FIG. 7 shows a left side view and a back side view of the example combination tool of FIG. 6.
Figure 8:
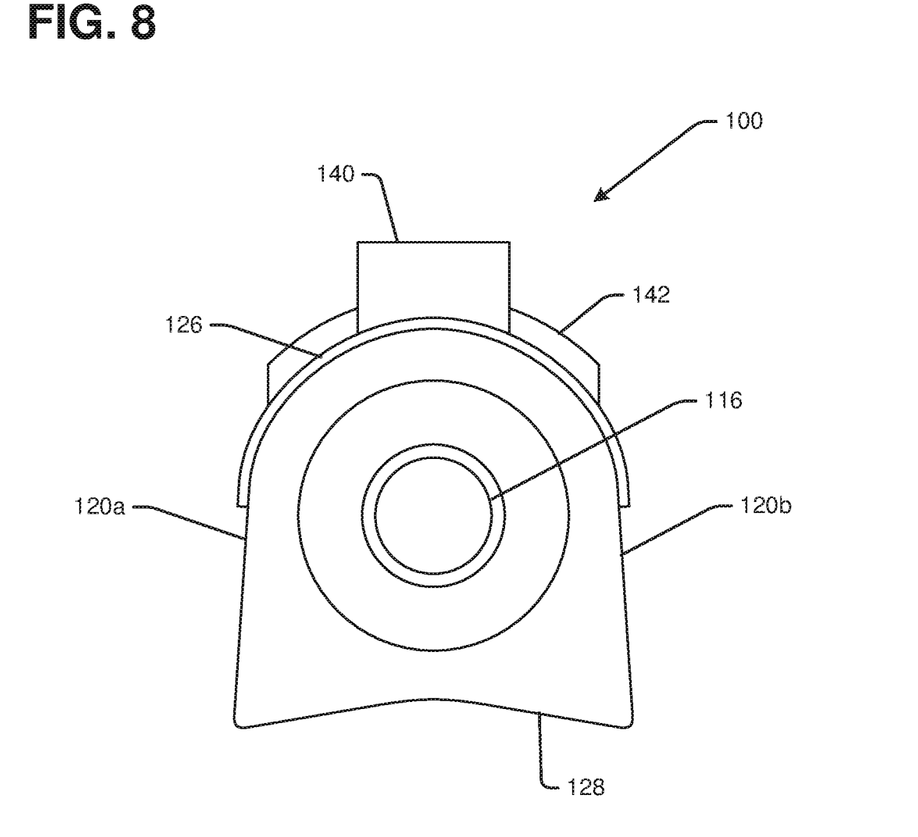
FIG. 8 shows a back side view of the example combination tool of FIG. 6.
Figure 9:
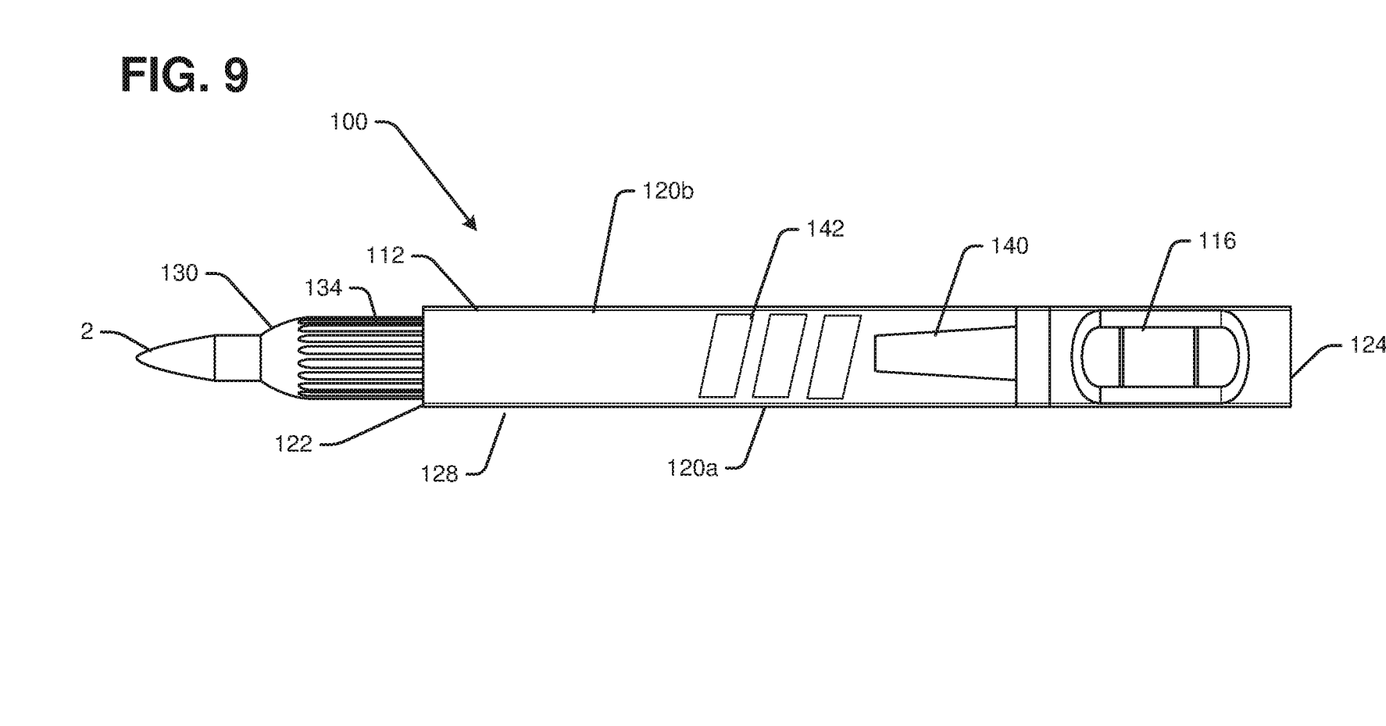
FIG. 9 shows a top view of the example combination tool of FIG. 6.
Figure 10:
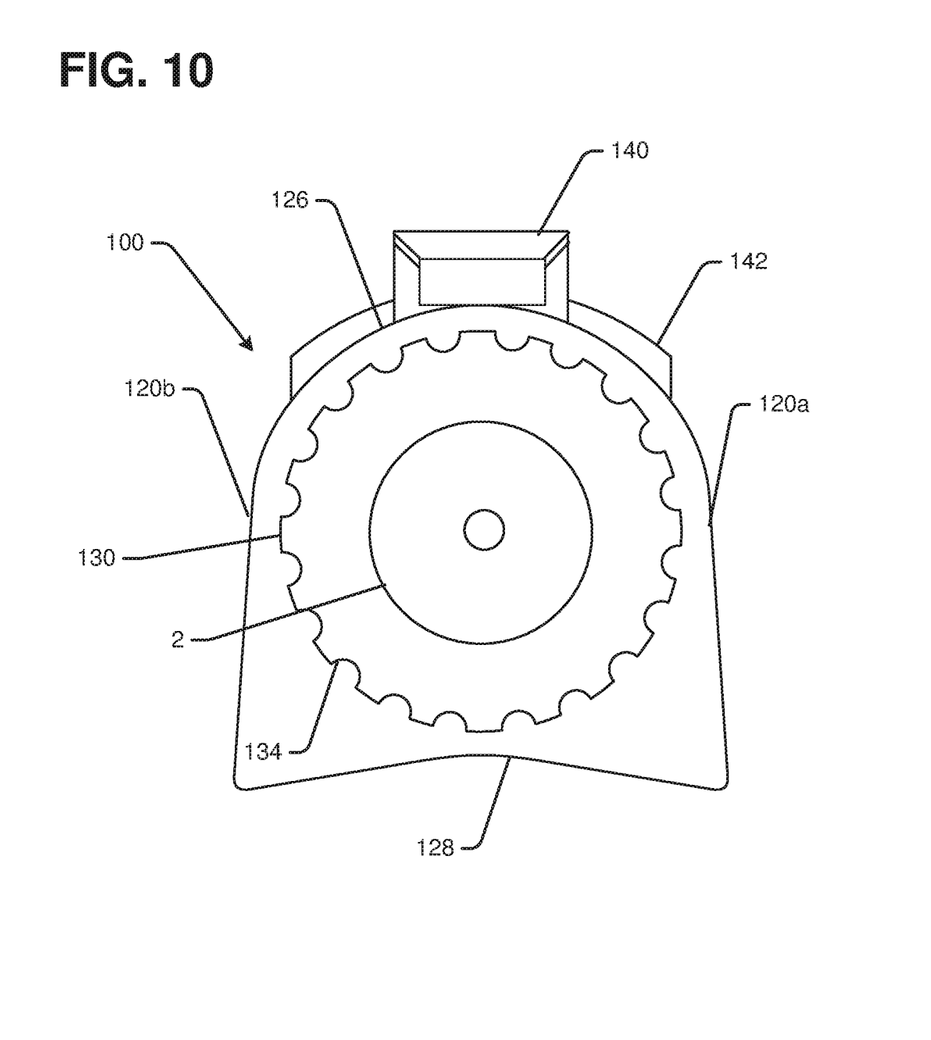
FIG. 10 shows a front side view of the example combination tool of FIG. 6.

FIG. 6 is a perspective view of another example combination tool 100 for marking, measuring, and checking level, as it may be configured for a round soapstone 2. FIG. 7 shows a left side view and a back side view of the example combination tool 100. FIG. 8 shows a back side view of the example combination tool 100. FIG. 9 shows a top view of the example combination tool 100. FIG. 10 shows a front side view of the example combination tool of 100. It is noted that 100-series reference numbers refer to similar components already described above for FIGS. 1-5 and may not be discussed again below for purposes of simplicity.

In an example, the combination tool 100 combines a marking device 2 (e.g., soapstone or round pencil), a holder 112 for the marking device, 2 and one or more measuring markings or ruler 114 and level 116 (e.g., vertical and/or horizontal). In this example, the holder 112 is configured to retain a substantially round marking device (e.g., soapstone or other marking device).

In an example, the holder 112 has a body 118 formed by a first side 120*a*, a second side 120*b*, a front side 122, a back side 124, a rounded (e.g., semi-circular shaped) top side 126, and a flat bottom side 128. The opening formed in the front side 122 of the body 118 is round (e.g., oval or circular shaped) for a round (e.g., oval or circular shaped) marking device 2.

In an example, the holder 112 may include a securement 130 to releasably secure the marking device 2 at least partially within a cavity formed inside the body 118. In this example, turning the securement 130 in a first direction (e.g., clockwise) tightens the marking device 2 within the body 118 of the holder 112. Turning the securement 130 in a second direction (e.g., counter-clockwise) loosens the marking device 2 in the body 118 of the holder 112 so that the marking device 2 slides in and out through an opening formed in the front side 122 of the body 118 to adjust a position of the marking device 2 for use in marking.

In an example, the securement 130 includes a plurality of splines (not visible in the figures) at least partially surrounding the marking device 2, and a cover 134 over the splines. Turning the cover 134 in a first direction tightens the splines against the marking device 2 to hold the marking device 2 in a fixed position during use. Turning the cover 134 in a second direction loosens the splines from the marking device 2 for adjusting a position of the marking device 2 to extend a predetermined distance out of the body 118.

As already described above for the tool 10, the combination tool 100 may also include a clip 140 to secure the holder 112 to a clothing item, clipboard, etc. The combination tool 100 may also include a grip 142 on at least one of the sides of the holder 112.

The combination tool disclosed herein may be manufactured of any suitable material. In an example, the combination tool may be made from metal and coated in plastic. A small metal clip is provided to move the soapstone (or pencil) up and down. However, other material(s) may also be suitable based on various design considerations, such as but not limited to, cost, weight, manufacturing, etc.

It is noted that the examples shown and described are provided for purposes of illustration and are not intended to be limiting. Still other examples are also contemplated.

The invention claimed is:

1. A combination tool for marking, measuring, and checking level, comprising:
   a holder for a marking device, the holder having a body formed by a first side, a second side, a front side, a back side, a top side, and a bottom side, wherein at least the bottom side is flat;
   a securement to releasably secure the marking device at least partially within the body, wherein loosening the securement enables the marking device to be slid in and out through an opening formed in the front side of the body to adjust the marking device for use in marking;
   a head and a shaft of the securement, wherein turning the head in a first direction moves the shaft down against the marking device to hold the marking device in a fixed position during use, and wherein turning the head in a second direction moves the shaft up and releases the marking device for adjusting a position of the marking device extending out of the body;
   measuring markings on at least one of the sides of the body; and
   at least one level in the body;
   wherein the securement includes a plurality of splines surrounding the marking device and a cover, and wherein turning the cover in a first direction tightens the splines against the marking device to hold the marking device in a fixed position during use, and wherein turning the cover in a second direction loosens the splines from the marking device for adjusting a position of the marking device extending out of the body.

2. The combination tool of claim 1, wherein the opening formed in the front side of the body is round for a round marking device.

3. The combination tool of claim 1, wherein the opening formed in the front side of the body is square or rectangular for a square or rectangular marking device.

4. The combination tool of claim 1, wherein the marking device is a soapstone.

5. The combination tool of claim 1, wherein the marking device is a pencil.

6. The combination tool of claim 1, wherein the marking device is a marker.

7. The combination tool of claim 1, further comprising both a vertical level and a horizontal level.

8. The combination tool of claim 1, further comprising a clip to secure the holder to a clothing item.

9. The combination tool of claim 1, wherein the measurement markings are on the first and/or second sides of the body.

10. The combination tool of claim 1, wherein one of the sides of the body has measurement markings in inches, and another of the sides has measurement markings in centimeters.

11. The combination tool of claim 1, further comprising a grip on at least one of the sides of the holder.

12. The combination tool of claim 11, wherein the grip is a padding made of rubber, silicon or other non-slip material.

13. A combination tool for marking, measuring, and checking level, comprising:
 a holder for a marking device, the holder having a body formed by a first side, a second side, a front side, a back side, a top side, and a bottom side, wherein at least the bottom side is flat;
 a securement to releasably secure the marking device at least partially within the body, wherein turning the securement in a first direction tightens the marking device within the body of the holder, and wherein turning the securement in a second direction loosens the marking device in the body of the holder so that the marking device slides in and out through an opening formed in the front side of the body to adjust a position of the marking device for use in marking;
 a plurality of splines surrounding the marking device and a cover, wherein turning the cover in a first direction tightens the splines against the marking device to hold the marking device in a fixed position during use, and wherein turning the cover in a second direction loosens the splines from the marking device for adjusting a position of the marking device extending out of the body;
 measuring markings on at least one of the sides of the body; and
 at least one level in the body.

14. The combination tool of claim 13, wherein the opening formed in the front side of the body is round for a round marking device.

15. The combination tool of claim 13, wherein the opening formed in the front side of the body is square or rectangular for a square or rectangular marking device.

16. The combination tool of claim 13, further comprising a clip to secure the holder to a clothing item.

17. The combination tool of claim 13, further comprising a grip on at least one of the sides of the holder.

18. A combination tool for marking, measuring, and checking level, comprising:
 a holder for a soapstone marking device, the holder having a body formed by a first side, a second side, a front side, a back side, a top side, and a flat bottom side;
 a securement to releasably secure the marking device at least partially within the body, wherein turning the securement in a first direction tightens the marking device within the body of the holder, and wherein turning the securement in a second direction loosens the marking device in the body of the holder so that the marking device slides in and out through an opening formed in the front side of the body to adjust a position of the marking device for use in marking;
 measuring markings on at least one of the sides of the body;
 at least one level in the body;
 a clip to secure the holder to a clothing item; and
 a grip on at least one of the sides of the holder.

\* \* \* \* \*